Nov. 10, 1931.  A. W. SCHNEEMAN  1,831,467
RECEIVING RECEPTACLE
Filed April 2, 1930
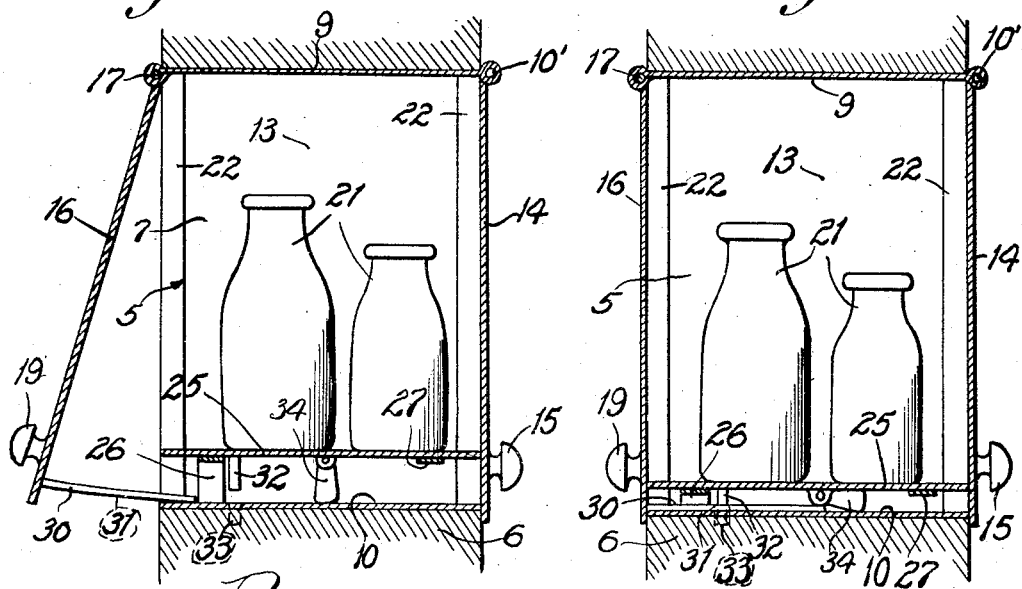
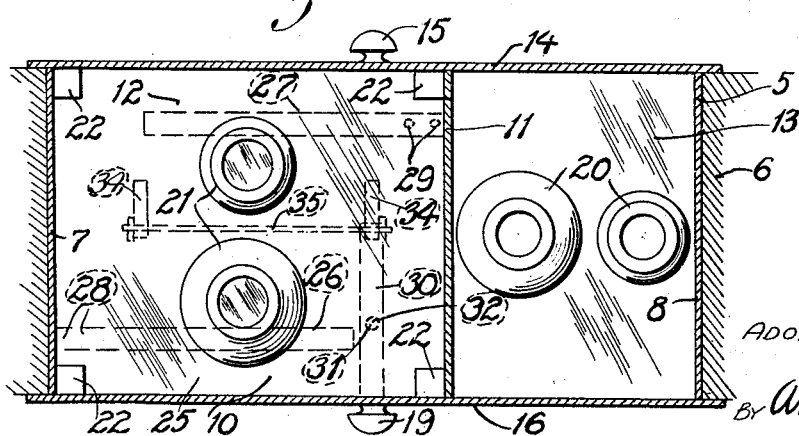
INVENTOR:
ADOLPH W. SCHNEEMAN.
By Arthur C Eckert
ATTORNEY.

Patented Nov. 10, 1931

1,831,467

UNITED STATES PATENT OFFICE

ADOLPH W. SCHNEEMAN, OF ST. LOUIS, MISSOURI

RECEIVING RECEPTACLE

Application filed April 2, 1930. Serial No. 440,934.

The object of my device is to make a receiving receptacle particularly for the reception of dairy products such as full and empty milk bottles and butter and cheese, etc. When milk and dairy products are delivered to the consumer they are usually placed on the porch or other exposed portion of the premises. This practice is unsanitary in that it permits dirt and foreign substances to enter the dairy products and permits cats and other animals to attack them. By the use of my device this is prevented. Furthermore in winter the products are subjected to the low temperatures that they freeze and are spoiled or destroyed. My device prevents this. In addition the products may be stolen, which is not the case with the use of my device. Furthermore, if a purchaser is absent for several days, the dairy man will continue to leave his products each succeeding day in which event they are spoiled or destroyed. By the use of my device this is prevented. When my device is used the receptacle is always closed, but unlocked when it contains empty bottles to be taken by the dairy man. It is always closed and locked when dairy products or any other products are placed therein. The removal of the dairy products by the purchaser unlocks the receptacle from the other side, but leaves the outside door closed. Preferably my receptacle is built in the outside wall in the rear of the house and has an access from the interior of the house, as well as from the exterior of the house. My device operates automatically, and is made of few and simple parts that lend themselves readily to multiple production. When not built in the wall it may be secured on a post or other convenient place and have the rear door locked by a padlock or other securing means. The front door or delivery end of the receptacle in this instance will function in the same manner as when the receptacle is built in a wall. The device may be easily assembled and repaired.

With these and other objects in view my invention has relation to certain novel features of construction and arrangement of parts as will be hereinafter more fully described, pointed out in the claims and illustrated in the drawings in which Fig. 1 is a front elevation of my device with the external door in its open position.

Fig. 2 is an enlarged transverse sectional elevation of the portion of my device used for the reception of dairy products such as milk bottles, with the external door in its open and unlocked position.

Fig. 3 is a sectional elevation similar to Fig. 2 with the external door in its closed and locked position.

Fig. 4 is a sectional plan view of the receptacle built in a wall with the external door closed. In all the views the inner door is shown in its closed position. My device may be preferably made of sheet metal.

Numeral 5 designates the receptacle generally, which is built into the wall 6. The receptacle is formed with the end plates 7 and 8, the top 9 and the floor 10. Numeral 11 designates a partition dividing the receptacle into the receiving portion 12 and the delivery portion 13. Numeral 14 designates the inner door, which is hinged to the top 9 by means of the hinge 10'. A conventional spring is secured to the hinge 10', so that the inner door 14 is normally in its closed position.

Numeral 15 designates a knob conveniently positioned on the inner door 14 providing a simple means for manual grasp. Numeral 16 designates the outer door, which is similar to the inner door 14 and is hinged to the top 9 by the hinge 17 to which hinge are secured the conventional spring 18 for normally holding the outer door 16 in its closed position. Numeral 19 designates a knob secured to the outer door 16 in a convenient position for easy manual grasp. Numerals 20 designate empty milk bottles and 21 full milk bottles. In the four corners of the receiving portion 12 are formed the rectangular posts 22, which extend from the floor 10 to the top 9. Numeral 25 designates a false bottom, which is of the shape of the interior bottom of the receiving portion 12, having rectangular portions cut out at the corners. These rectangular cut out portions permit the positioning of false bottom 25, in vertical sliding engagement in the receiving portion 12. The false bottom 25 fits snugly in the receiving portion 12. On account of the rectangular posts 22 and the fit around them of the false bottom 25, the false bottom 25 may not be slid out of either the front or rear of the receiving portion 12, that is, it may not be slid through the outer door 16, nor the inner door 14. In order to secure the false bottom 25 in yielding spaced relationship with the floor 10, the springs 26 and 27 are provided. The spring 26 has its one end secured to the floor 10 by means of the screws 28. The spring 26 is bent upwardly as best shown in Fig. 1. Its free end is not secured. The spring 27 is secured to the floor 10 by means of the screws 29. Its free end is not secured. The springs 26 and 27 are of the same size and shape and so positioned that when the false bottom 25 is supported on them that the false bottom 25 will lie in a horizonal plane. Near the bottom of the outer door 16 and at right angles thereto is secured the arm 30 having the hole 31 formed therein. Numeral 32 designates a depending pin secured to the lower surface of the false bottom 25 and at right angles thereto. The depending pin 32 is in the same vertical plane as the arm 30. The hole 31 in the arm 30 is so positioned that when the outer door 16 is closed that the depending pin 32 will be vertically above the hole 31, so that if the depending pin 32 is lowered, it will pass through the hole 31. In the floor 10 immediately beneath the depending pin 32 is formed a hole 33. When the depending pin 32 is lowered, sufficiently, it not only passes through the hole 31, but also into the hole 33. The false bottom 25, when it has no weight superimposed thereon, that is when no milk bottles, as 21, are positioned thereon is held in a position, that the pin 32 is out of engagement with the hole 33. It will be seen that by the structure thus far described that the outer door 16 may be locked, by closing the outer door 16 and depressing the depending pin 32, into the hole 31. This depression of the depending pin 32 is accomplished automatically when the weight of the full milk bottles 21 is placed on the false bottom 25. It is evident that by the structure thus far described that the positioning of the full milk bottles 21 on the false bottom 25 would immediately lower the false bottom 25 by depressing the springs 26 and 27 and that this depression would occur before the outer door 16 could be moved to its closed position. This would prevent, not only the locking of the outer door 16, but would prevent its total closure, because the arm 30 would come in contact with the depending pin 32 and the arm 30 could not be further moved inwardly.

In order to prevent the false bottom 25 from being lowered, when it is weighted with full milk bottles 21 before the outer door 16 arrives at the point where the hole 31 is in registration with the depending pin 32, the following structure is provided.

Numeral 34 designates a leg hingedly secured to the bottom of the false bottom 25 in the path of the arm 30. The arm 30 is of such length beyond the hole 31 that it rotates in an anti-clockwise direction 90 degrees the leg 34, when it comes in contact with said leg. The leg 34, due to its weight, is normally suspended in the vertical position shown in Fig. 2. The leg 34 is of such length that it may easily rotate in the space between the floor 10 and the false bottom 25, but that a slight pressure on the false bottom 25, by the weight of the milk bottles 21 will push it in contact with the floor 10 and support the false bottom 25 in the position shown in Fig. 2. When the arm 30 strikes the leg 34, the latter is rotated to the position shown in Fig. 3. This removes the support of the false bottom 25 and causes the false bottom 25 to be lowered against the compression of the springs 26 and 27. By this time, the outer door 16 has been closed and the hole 31 is in registration with the depending pin 32. As the lowering of the false bottom 25 continues owing to the weight of the full milk bottles 21, depending pin 32 is passed through the hole 31 and the outer door 16 is not only closed but locked. It is to be noted that the opening of the outer door 16 when the false bottom 25 is in the position shown in Fig. 3 is not only prevented by the engagement of the depending pin 32 in the hole 33, but also because of the fact that the false bottom 25 may not be slid forwardly owing to the rectangular posts 22 on the front side of the receiving portion 12. It may be desirable to have more than one leg 34 and to have the additional legs actuated at the same time on account of the actuation of the leg 34. This may be accomplished by having the additional legs rotatively secured in the false bottom 25 and having all the legs keyed to a shaft such as 35. It will be seen that by such a structure all of the supports such as leg 34 would be rotated or oscillated when the leg 34 is rotated or oscillated.

The full milk bottles 21 are removed by the purchaser by opening the inner door 14. When the full milk bottles 21 are removed the springs 26 and 27 return the false bottom 25 from the position shown in Fig. 3 to that shown in Fig. 2 and the outer door 16 is unlocked. If the purchaser fails to remove the milk bottles 21 on one day, the milk man will know this fact because the outer door 16 will remain locked. It is not necessary to have the outer door 16 locked when only empty milk bottles are placed in the delivery portion 13. In this event, it is only necessary to have the outer door closed. The purchaser places the empty milk bottles in the delivery portion 13 and not in the receiving portion 12, because he desires the outer door 16 to be in its unlocked position.

It is likewise noted that by my structure, it is only necessary for the springs 26 and 27 to raise the false platform 25 when it is not loaded, that is when there are no full milk bottles 21 positioned on it. The hole 31 may be made slightly larger than the cross section of the depending pin 32 to facilitate the easy withdrawal of the depending pin 32 from the hole 31 when the false bottom 25 is raised.

What I claim is:

1. A receptacle having a delivery portion and a receiving portion and having a single outer door for both portions, said receiving portion comprising a false bottom so positioned therein that the placing of a weight on said false bottom will depress said false bottom, door locking means that are actuated by the depression of said false bottom, said delivery portion so constructed that the positioning of products therein will not lock said outer door when it is closed.

2. A receptacle having a delivery portion and a receiving portion and having a single outer door for both portions, said receiving portion comprising a false bottom so positioned therein that the placing of a weight on said false bottom will depress said false bottom, said false bottom being so shaped as to prevent its being slid horizontally from said receptacle through said door, door locking means that are actuated by the depression of said false bottom, said delivery portion so constructed that the positioning of products therein will not lock said outer door when it is closed.

In testimony whereof I affix my signature.

ADOLPH W. SCHNEEMAN.